United States Patent [19]
Chu et al.

[11] Patent Number: 5,442,766
[45] Date of Patent: Aug. 15, 1995

[54] METHOD AND SYSTEM FOR DISTRIBUTED INSTRUCTION ADDRESS TRANSLATION IN A MULTISCALAR DATA PROCESSING SYSTEM

[75] Inventors: Tan V. Chu; Charles R. Moore; John S. Muhich; Terence M. Potter, all of Austin, Tex.

[73] Assignee: International Business Machines Corporation, Armonk, N.Y.

[21] Appl. No.: 959,194

[22] Filed: Oct. 9, 1992

[51] Int. Cl.[6] .......................... G06F 12/10; G06F 9/38; G06F 12/12; G06F 12/08

[52] U.S. Cl. ..................................... 395/414; 395/375; 395/416; 395/417; 395/450; 395/415; 364/256.4; 364/261.5; 364/261.3; 364/263.1; 364/228.2

[58] Field of Search .................... 395/425, 400, 375

[56] References Cited

U.S. PATENT DOCUMENTS

| | | | |
|---|---|---|---|
| 4,680,700 | 7/1987 | Hester et al. | 395/400 |
| 4,899,275 | 2/1990 | Sachs et al. | 395/425 |
| 5,142,634 | 8/1992 | Fite et al. | 395/375 |
| 5,148,538 | 9/1992 | Celtruda et al. | 395/425 |
| 5,155,825 | 10/1992 | Moughanni et al. | 395/425 |
| 5,155,828 | 10/1992 | La Fetra et al. | 395/425 |
| 5,163,140 | 11/1992 | Stiles et al. | 395/425 |
| 5,168,538 | 9/1992 | Shibuya | 395/375 |
| 5,214,765 | 5/1993 | Jenson | 395/425 |
| 5,263,140 | 11/1993 | Riordan | 395/400 |
| 5,392,410 | 2/1995 | Liu | 395/400 |

OTHER PUBLICATIONS

Teller, Patricia J., "Translation–Lookaside Buffer Consistency"; *Computer* 23 (1990) Jun., No. 6; pp. 26–36.

*Primary Examiner*—Glenn Gossage
*Assistant Examiner*—Reginald Bragdon
*Attorney, Agent, or Firm*—Michael A. Davis; Andrew J. Dillon

[57] ABSTRACT

A method and system for distributed instruction address translation in a multiscalar data processing system having multiple processor units for executing multiple tasks, instructions and data stored within memory at real addresses therein and a fetcher unit for fetching and dispatching instructions to the processor units. A memory management unit (MMU) is established which includes a translation buffer and translation algorithms for implementing page table and address block type translations of every effective address within the data processing system into real addresses within memory. A translation array, which includes a small number of translation objects for translating effective addresses into real addresses, is then established within the fetcher unit. The translation objects are periodically and selectively varied, utilizing the translation capability of the memory management unit (MMU), in response to a failure to translate an effective address into a real address within the fetcher unit. A translation object within the translation array is preferably replaced each time the fetcher unit fails to translate an effective address into a real address by replacing the least recently utilized (LRU) translation object with a newly determined translation object. In the event of a predicted conditional branch instruction, the utilization status (LRU) is temporarily stored and thereafter utilized to restore the translation array to its previous (LRU) state if the predicted conditional branch is resolved as incorrect. In this manner, the least recently utilized (LRU) state of the translation array will not be corrupted by incorrect path predictions.

10 Claims, 5 Drawing Sheets

METHOD AND SYSTEM FOR DISTRIBUTED INSTRUCTION ADDRESS TRANSLATION IN A MULTISCALAR DATA PROCESSING SYSTEM

BACKGROUND OF THE INVENTION

1. Technical Field

The present invention relates in general to improved multiscalar data processing systems and in particular to improved methods and systems for instruction address translation in a multiscalar data processing system. Still more particularly, the present invention relates to methods and systems for distributed instruction address translation in a multiscalar data processing system.

2. Description of the Related Art

Designers of modern state-of-the-art data processing systems are continually attempting to enhance the performance aspects of such systems. One technique for enhancing data processing system efficiency is the achievement of short cycle times and a low Cycle's-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within multiscalar processor systems is the fact that such systems typically execute multiple tasks simultaneously. Each of these multiple tasks typically has a virtual or effective address space which is utilized for execution of that task. Locations within such a virtual or effective address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within the multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

This problem is further exacerbated by the fact that multiple translation mechanisms may be utilized. For example, a page table translation (PTE) is utilized to map an effective or virtual page of memory to a real page of memory within a page system memory and is utilized with a consistently sized translation object. However, an address block translation (BAT) may be utilized to map a translation object which ranges in size from a one hundred twenty-eight kilobyte block to an eight megabyte block. Thus, the variation in translation algorithm and the necessity of translating each effective instruction address into a real instruction address during application execution can result in substantial delays in a multiscalar processor system.

This translation problem is particularly burdensome during execution of instructions and in many known multiscalar processor systems the retrieval of instructions has been accomplished utilizing a so-called "fetcher" which retrieves instructions and then dispatches those instructions to one of the independent processor units. Known multiscalar processor systems typically include instruction fetchers which are capable of "in-page" fetching, that is the fetcher is not capable of translation and can only prefetch instructions from a single specified page within memory. Alternately, an "out-of-page" fetcher typically requires an instruction translation lookaside buffer (TLB), segment register access and all of the overhead associated with a separate translation unit. These capabilities were required in addition to the memory management units provided with such systems for address translation and memory management.

Upon reference to the foregoing, those skilled in the art will appreciate that it would be advantageous to provide an instruction fetcher which could rapidly and efficiently translate effective instruction addresses into real instruction addresses without requiring the utilization of substantial hardware assets or the inherent delay required to access and utilize the system memory management unit.

SUMMARY OF THE INVENTION

It is therefore one object of the present invention to provide an improved multiscalar data processing system.

It is another object of the present invention to provide an improved method and system for instruction address translation in a multiscalar data processing system.

It is yet another object of the present invention to provide an improved method and system for distributed instruction address translation in a multiscalar data processing system.

The foregoing objects are achieved as is now described. A method and system are disclosed for distributed instruction address translation in a multiscalar data processing system having multiple processor units for executing multiple tasks, instructions and data stored within memory at real addresses therein and a fetcher unit for fetching and dispatching instructions to the processor units. A memory management unit (MMU) is established which includes a translation buffer and translation algorithms for implementing page table and address block type translations of every effective address within the data processing system into real addresses within memory. A translation array, which includes a small number of translation objects for translating effective addresses into real addresses, is then established within the fetcher unit. The translation objects are periodically and selectively varied, utilizing the translation capability of the memory management unit (MMU), in response to a failure to translate an effective address into a real address within the fetcher unit. In this manner the fetcher unit may efficiently translate effective addresses into real addresses without continual access to the memory management unit (MMU) and the concomitant loss of efficiency such access entails. A translation object within the translation array is preferably replaced each time the fetcher unit fails to translate an effective address into a real address by replacing the least recently utilized (LRU) translation object with a newly determined translation object. In the event of a predicted conditional branch instruction, the utilization status (LRU) is temporarily stored and thereafter utilized to restore the translation array to its previous (LRU) state if the predicted conditional branch is resolved as incorrect. In this manner, the least recently utilized (LRU) state of the translation array will not be corrupted by incorrect path predictions.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
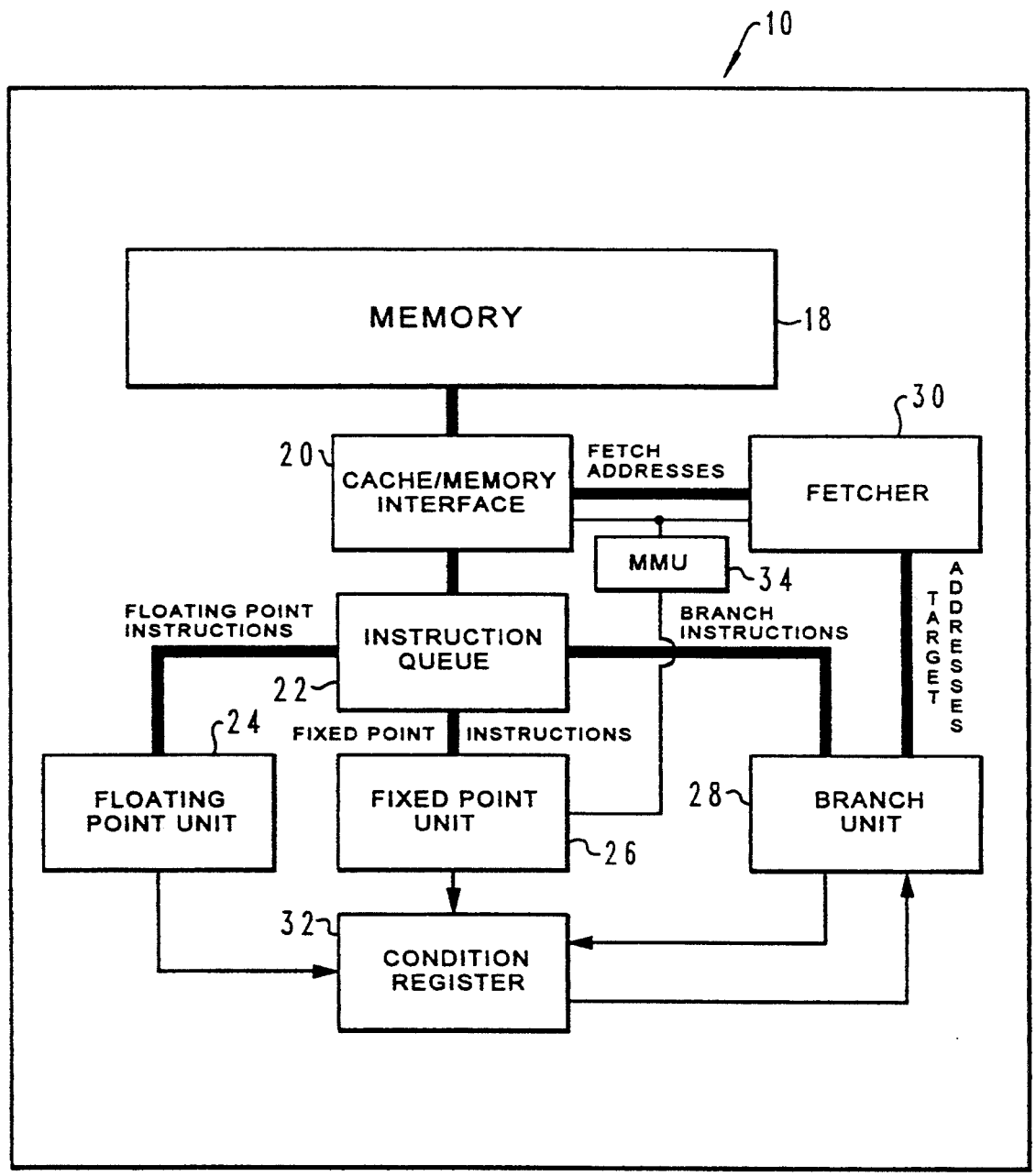
FIG. 1 is a high level block diagram of a multiscalar computer system which may be utilized to implement the method and system of the present invention.

With reference now to the Figures and in particular with reference to FIG. 1, there is depicted a high level block diagram of a multiscalar computer system 10 which may be utilized to implement the method and system of the present invention. As illustrated, computer system 10 preferably includes a memory 18 which is utilized to store data, instructions and the like. Data or instructions stored within memory 18 are preferably accessed utilizing cache/memory interface 20 in a method well known to those having skill in the art. The sizing and utilization of cache memory systems is a well known subspecialty within the data processing art and not addressed within the present application. However, those skilled in the art will appreciate that by utilizing modern associative cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a multiscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such multiscalar computer systems, instruction queue 22 is utilized to dispatch instructions to multiple execution units. As depicted within FIG. 1, computer system 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as computer system 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, computer system 10 also preferably includes a condition register 32. Condition register 32 is utilized to temporarily store the results of various comparisons which may occur utilizing the outcome of sequential instructions which are processed within computer system 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, a branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

As those skilled in the art will appreciate, each task within multiscalar computer system 10 will typically have associated therewith an effective or virtual memory space and instructions necessary to implement each task will be set forth within that space utilizing effective or virtual addresses. Thus, fetcher 30 must be able to determine the real address for instructions from the effective addresses utilized by each task. As described above, prior art implementations of fetcher 30 typically either incorporate a complex translation lookaside buffer (TLB), sequence register and multiple translation algorithms or, alternately, such instruction fetchers are required to access a memory management unit (MMU) having such complex translation capability in order to determine real instruction addresses from effective or virtual instruction addresses.

Also depicted within multiscalar computer system 10 is memory management unit (MMU) 34. Memory management unit, as will be described in greater detail herein, preferably includes a translation lookaside buffer (TLB) and all necessary registers and translation algorithms which may be utilized to translate each effective address within multiscalar computer system 10 into a real address within memory 18. Since fetcher units typically have a very low priority for accessing a memory management unit (MMU), the obtaining of real instruction addresses utilizing the memory management unit (MMU) typically results in a substantial performance degradation in multiscalar computer systems.

Figure 2:
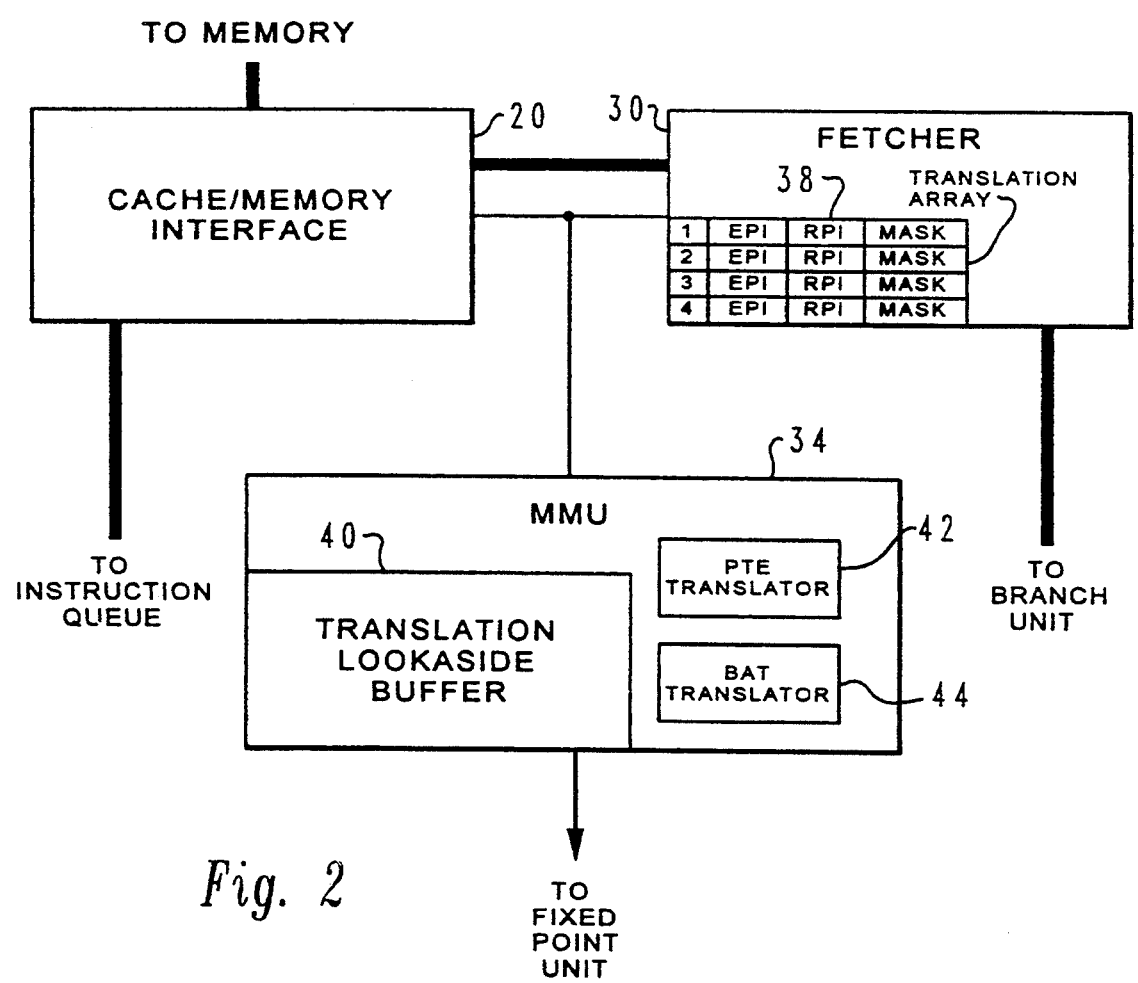
FIG. 2 is a high level block diagram illustrating the distributed instruction address translation function within the multiscalar computer system of FIG. 1.

Referring now to FIG. 2, there is depicted a high level block diagram illustrating the distributed instruction address translation function within the multiscalar computer system of FIG. 1. As illustrated within FIG. 2, the relationship between cache/memory interface 20, fetcher 30 and memory management unit (MMU) 34 is depicted. As is typical in known memory management units, memory management unit (MMU) 34 includes a substantially sized translation lookaside buffer (TLB). Those skilled in the art will appreciate that a translation lookaside buffer (TLB) is often utilized as a fairly rapid technique for translating from effective or virtual address to real address. Also present within memory management unit (MMU) 34 is PTE translator 42 and BAT translator 44. As described above, PTE translator 42 is preferably utilized to implement page table type translation and BAT translator 44 is utilized to translate address block type translations. Those skilled in the art will appreciate that these two translation algorithms are substantially different, in that a page table translation occurs within a system having consistently sized memory pages while an address block translation may result in a defined address block having a size ranging from a one hundred twenty-eight kilobyte block to an eight megabyte block of memory.

Thus, upon reference to FIG. 2, those skilled in the art will appreciate that by utilizing translation lookaside buffer (TLB) 40 in conjunction with PTE translator 42, all effective addresses within multiscalar computer system 10 (see FIG. 1), which utilizes the page table translation may be translated into a real address within system memory. Of course, those skilled in the art will also appreciate that a segment register is also utilized for such translations. Alternately, address block translations may be accomplished utilizing only BAT translator 44. By providing multiple translation algorithms in the manner depicted, every effective or virtual address within multiscalar computer system 10 may be translated into a real address within system memory by utilizing memory management unit (MMU) 34.

Referring now to fetcher 30, an important feature of the present invention is illustrated. As depicted within fetcher 30, a translation array 38 is provided. Translation array 38 preferably includes a small number of translation objects. In the depicted embodiment of the present invention translation array 38 includes four translation objects. Each translation object within translation array 38 includes a twenty bit effective page index (EPI), a twenty bit real page index (RPI), and an eleven bit mask value. As will be explained in greater detail herein, the effective page index (EPI), real page index (RPI) and mask may be utilized to rapidly and efficiently translate both page table translations and address block translations for a selected number of effective addresses within multiscalar computer system 10. As will be apparent upon reference to the foregoing, a multiscalar computer system may include literally hundreds of pages of instructions; however, for a given application the number of pages of memory utilized for instructions may be quite small. By selectively choosing the translation objects which are stored within translation array 38, and varying the content of translation array 38 in a manner which will be described in greater detail herein, the Applicants have determined that a very high percentage of instruction translation requests may be accomplished within fetcher 30 by utilizing translation array 38, without requiring continual access to memory management unit (MMU) 34 and the concomitant decrease in system efficiency which such access entails.

Figure 3:
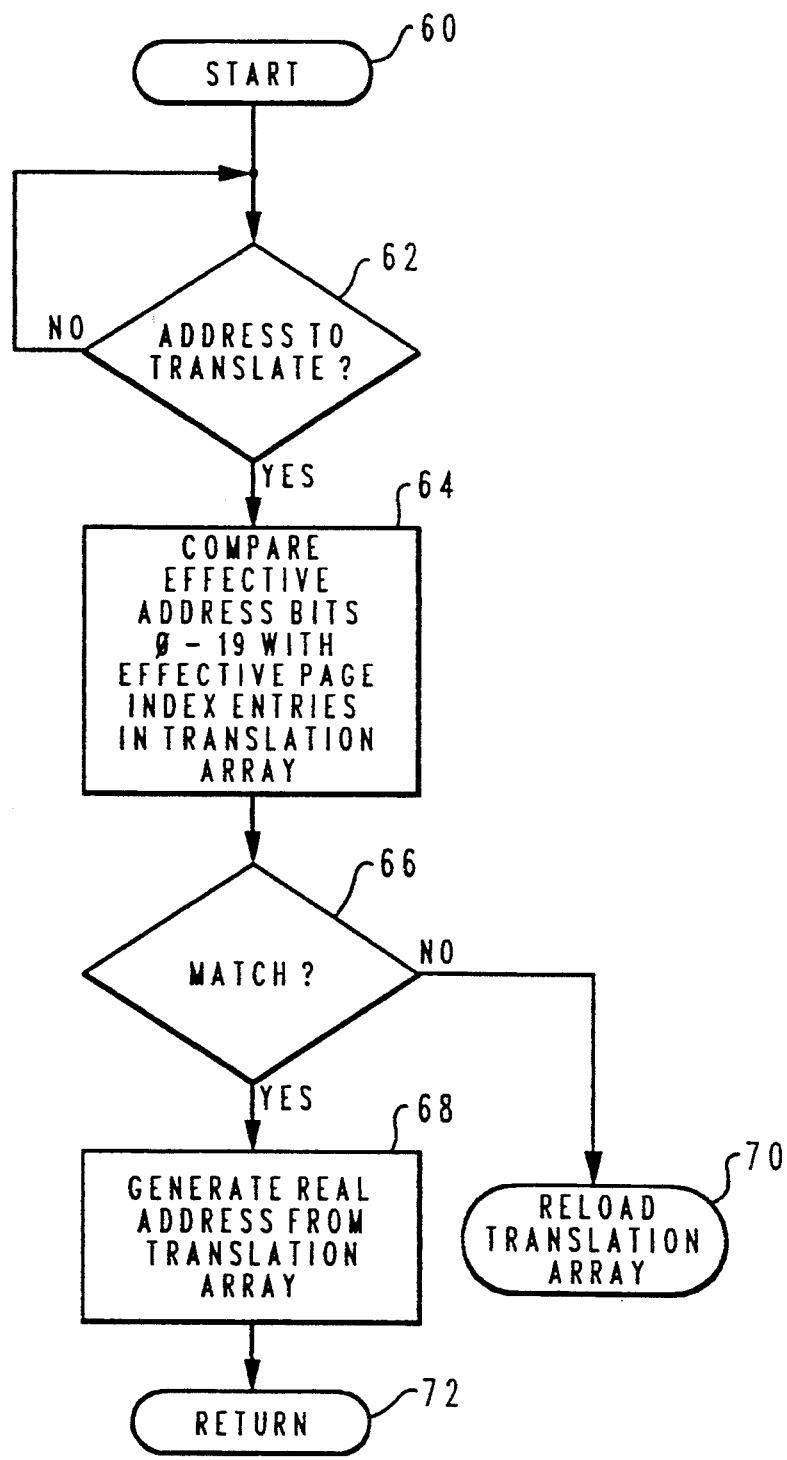
FIG. 3 is a high level logic flowchart illustrating the translation of an instruction address utilizing a translation array within the instruction fetcher of the multiscalar computer system of FIG. 1.

With reference now to FIG. 3, there is depicted a high level logic flowchart which illustrates the translation of an instruction address utilizing translation array 38 within instruction fetcher 30 of multiscalar computer system 10. As depicted, the process begins at block 60. Thereafter, the process passes to block 62 which illustrates a determination of whether or not a translation of an instruction address is required. If not, the process merely iterates until such time as the translation of an instruction address is required.

Once an instruction address translation is required, the process passes to block 64. Block 64 illustrates the comparing of the first twenty address bits of the effective address with each of the effective page index entries within translation array 38. This comparison is necessary to determine whether or not the translation objects present within translation array 38 are sufficient to permit a translation of the instruction effective address to a real address within multiscalar computer system 10. Thereafter, the process passes to block 66 which illustrates a determination of whether or not the first twenty address bits of the effective address are a match for any of the four effective page index entries present within translation array 38. If not, the process passes to block 70 which depicts the reloading of the translation array to vary the translation objects therein. In a manner which will be described in greater detail below, this technique is utilized to ensure that translation array 38 continually contains those translation objects which are most efficient at translating instruction addresses during execution of a selected application.

Referring again to block 66, in the event a match occurs between the first twenty bits of the effective address and one of the effective page index entries within translation array 38, the process passes to block 68. Block 68 illustrates the generation of a real address from the translation array. For purposes of illustrating the present invention, a thirty-two bit effective address and thirty-two bit real address for each instruction within the multiscalar computer system is presumed. Thus, an effective page number will constitute the first twenty bits of the effective address and the page offset will constitute the remaining twelve bits of the effective address. As described above, each entry within the translation array comprises a twenty bit effective page index, a twenty bit real page index and an eleven bit mask. The effective page number of each instruction to be translated is then compared within each translation object within the translation array. If an effective page number matches one of the effective page entries within translation array 38, the real address for the instruction is constructed utilizing the effective page index (EPI), real page index (RPI) and mask as follows:

$$RA = RPI_{no,8} \,||\, [(MASK_{0,10} \,\&\, RPI_{n\,9,\,19}) \,|\, (\neg MASK_{0,10} \,\&\, EPI_{n9,\,19})] \,||\, PO_{0,11}$$

As those skilled in the art will appreciate upon reference to the foregoing, the real address (RA) constitutes the first nine bits of the real page index (RPI) concatenated with a combination of the eleven bit mask value and the real page index (RPI) and effective page index (EPI) along with the last twelve bits of the page offset (PO). When combined in the manner described above in equation (1) the resultant real address will constitute a real page number which varies between nine bits and twenty bits together with an offset value which may vary from twelve bits to twenty-three bits. Thus, by varying the content of the mask provided within each translation object within translation array 38, each of the translation algorithms may be effectively carried out by selectively combining the mask value with portions of the effective and real page index in the manner described. Thereafter, after generating a real address utilizing the translation objects contained within translation array 38, the process of FIG. 3 passes to block 72 and returns.

Figure 4:
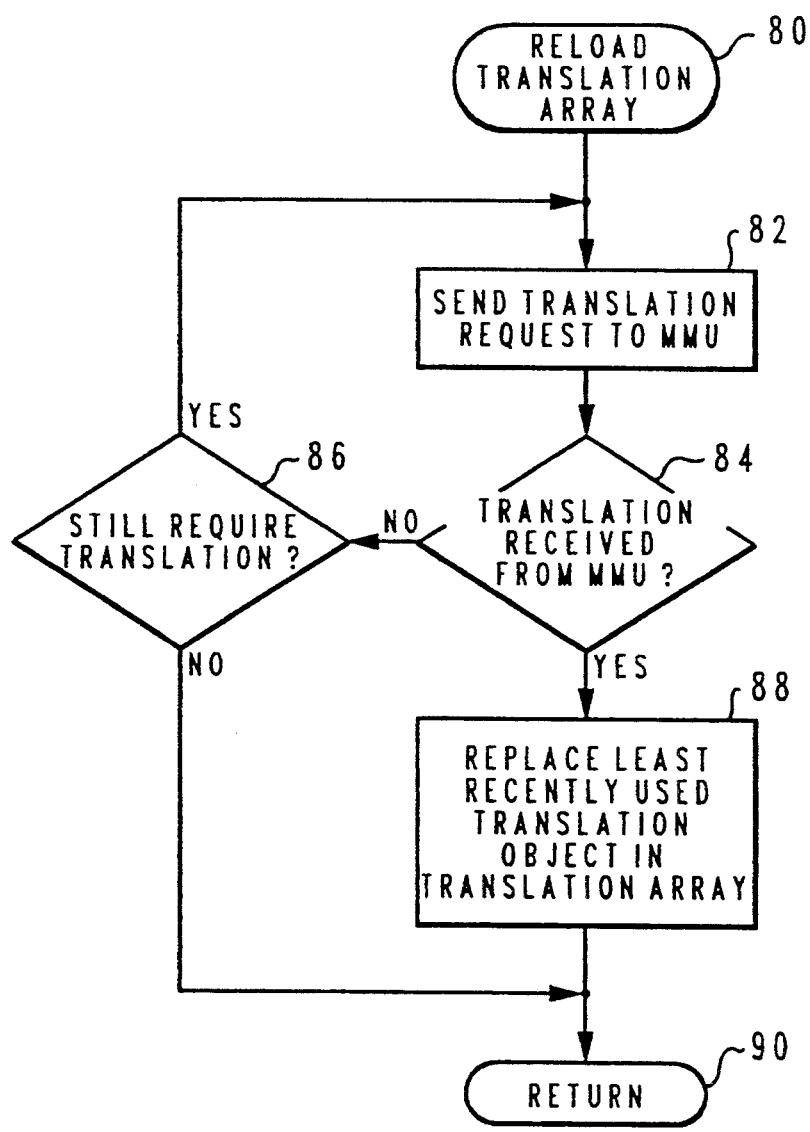
FIG. 4 is a high level logic flowchart illustrating the modification of the translation array within the instruction fetcher of the multiscalar computer system of FIG. 1.

Referring now to FIG. 4, there is depicted a high level logic flowchart which illustrates the modification of translation array 38 within instruction fetcher 30 of multiscalar computer system 10. As illustrated, this process begins at block 80 and a reload of the translation array is requested in block 70 of FIG. 3. Thereafter, the process passes to block 82 which depicts the sending of a translation request from instruction fetcher 30 to memory management unit (MMU) 34. As described above, this will occur as a result of the failure to find a match between the first twenty bits of an effective address with any of the four effective page index entries within translation array 38. Thereafter, the process passes to block 84. Block 84 illustrates a determination of whether or not a translation of that effective address and the associated mask for translation array 38 have been received from memory management unit (MMU) 34. If not, the process passes to block 86. Block 86 depicts a determination of whether or not a translation is still required, and if so, the process returns iteratively to block 82 to once again send a translation request to memory management unit (MMU) 34. Still referring to block 86, in the event no translation is currently required, the process passes to block 90 and returns.

Referring again to block 84, in the event a translation and associated mask value have been received from memory management unit (MMU) 34, for an effective address, the process passes to block 88. Block 88 illustrates the replacing of the least recently used translation object within translation array 38 with the newly determined translation object, such that the translation objects present within translation array 38 are continually varied to provide the most efficient translation of effective instruction addresses into real instruction addresses for a particular application. Thereafter, the process passes to block 90 and returns.

Figure 5:
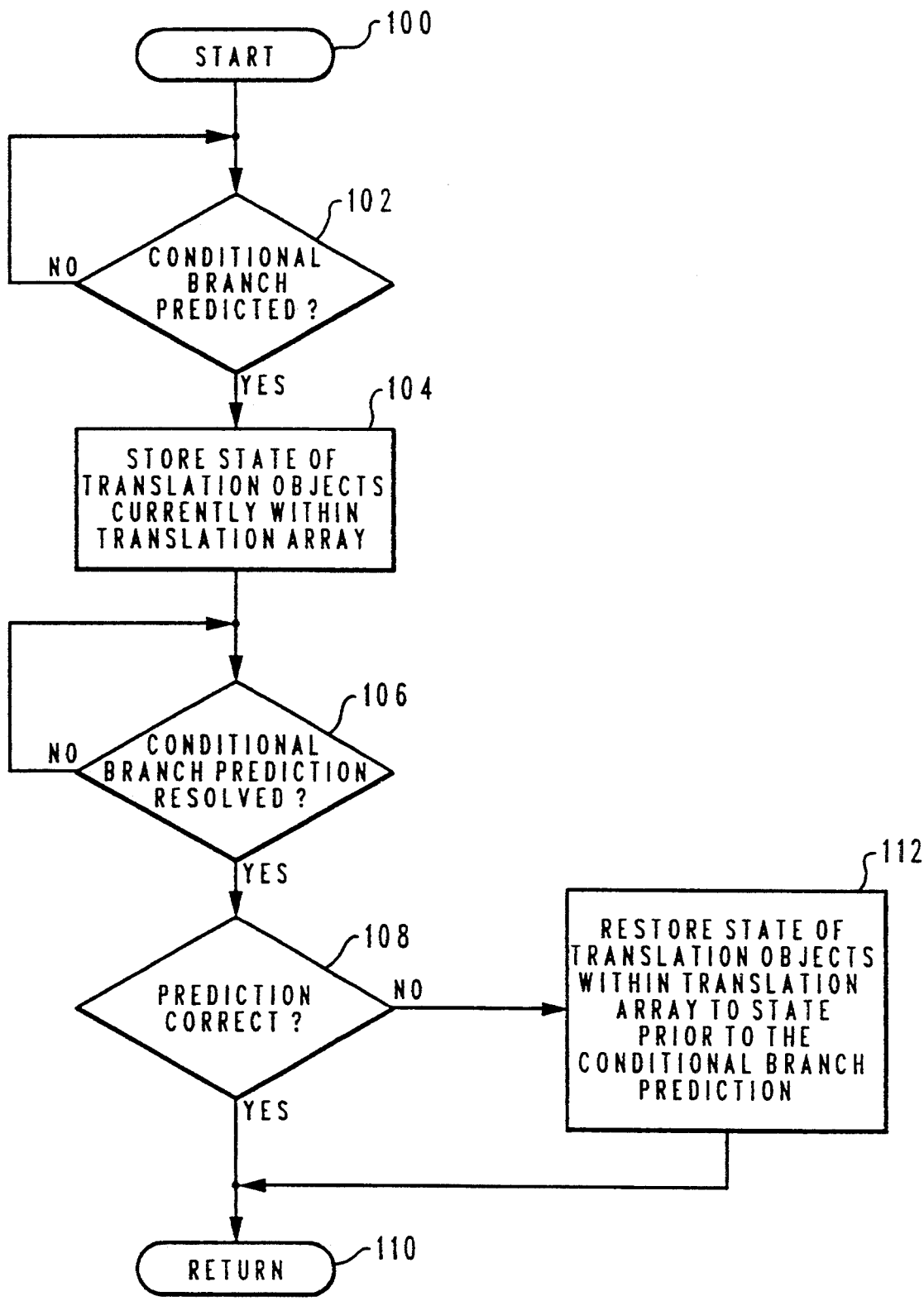
FIG. 5 is a high level logic flowchart illustrating the restoration of the state of the translation array within the instruction fetcher of the multiscalar computer system of FIG. 1.

Finally, with reference to FIG. 5, there is depicted a high level logic flowchart illustrating the restoration of the state of translation array 38 within instruction fetcher 30 of multiscalar computer system 10 following an incorrect conditional branch prediction. As illustrated, this process begins at block 100 and thereafter passes to block 102. Block 102 depicts a determination of whether or not a conditional branch instruction has been detected within instruction queue 22 (see FIG. 1) and whether or not an outcome for that conditional branch has been predicted. As described above, if an outcome is predicted for a conditional branch instruction, target instructions for the predicted branch are fetched and placed within the instruction queue. Those skilled in the art will appreciate upon reference to this description that the prediction of a conditional branch and the fetching of target instructions associated therewith may possibly have an adverse effect on the efficiency of translation array 38 if the predication is not correct.

Still referring to block 102, in the event a conditional branch instruction has been detected and the conditional branch outcome is not predicted, the process merely iterates until such time as that condition occurs. Alternately, in the event a conditional branch outcome has been predicted for an encountered conditional branch instruction, the process passes to block 104. Block 104 illustrates the storing of the current state of the translation objects within translation array 38. Thereafter, the process passes to block 106.

Block 106 depicts the determination of whether or not the conditional branch prediction has been resolved and if not, the process merely iterates until such time as the conditional branch prediction has been resolved. This is typically accomplished by the encountering of a compare instruction and the determination of the state of that comparison within a condition register. Thereafter, upon the resolution of a conditional branch prediction, the process passes to block 108. Block 108 illustrates a determination of whether or not the conditional branch prediction was correct and if so, the process passes to block 110 and returns. No further action will be required due to the fact that the translation objects within translation array 38 will have been modified to accommodate the new set of target instructions and a successful prediction of that conditional branch necessitates the continued utilization of those translation objects. However, in the event the conditional branch prediction was not correct, as determined at block 108, the process passes to block 112. In accordance with an important feature of the present invention, block 112 illustrates the restoration of the state of the translation objects within translation array 38 to the state which existed prior to the conditional branch prediction.

In this manner, the least recently used state of translation array 38 is not corrupted by incorrect path predictions. This is especially true for those situations in which translation objects within the translation array have been replaced while fetching target instructions from an incorrectly predicted path. Furthermore, code location may be optimized utilizing a least recently used algorithm within the translation array as a result of predictability. Since such software cannot predict whether or not a conditional branch will be predicted, the least recently used state cannot be determined if incorrectly predicted branches corrupt that state.

Upon reference to the foregoing those skilled in the art will appreciate that the Applicants herein have provided a method and system for distributed instruction address translation within a multiscalar data processing system which permits a relatively small translation array within an instruction fetcher to be utilized in a highly efficient manner to translate effective instruction addresses into real instruction addresses, whether those translations require the utilization of a page table type translation (PPE) or an address block type translation (BAT), by the simple expedient of selecting a mask which may be selectively combined with the effective page number and effective page offset to generate a real address for the instruction.

The Applicants have discovered that relatively few number of pages within a page memory system are required to locate instructions for a given process and thus, an associative translation array, such as the structure described herein, may be operated in a manner similar to a memory cache structure, such that the system will enjoy the benefit of a large translation lookaside buffer (TLB) without the performance penalty required to access that translation function each time an instruction is fetched. Further, by providing a mask entry which may be selectively combined with the effective address the translation array can be utilized for multiple types of translation algorithms without requiring the logic typically utilized for such translation algorithms within the instruction fetcher.

While the invention has been particularly shown and described with reference to a preferred embodiment, it will be understood by those skilled in the art that various changes in form and detail may be made therein without departing from the spirit and scope of the invention.

We claim:

1. A method in a multiscalar data processing system having a plurality of processor units for executing multiple tasks, memory for storing a plurality of instructions and data at multiple real addresses therein and a fetcher unit for fetching and dispatching instructions to said plurality of processor units, for efficiently translating a plurality of effective instruction addresses utilized within said multiple tasks into real addresses within said memory, said method comprising the steps of:

establishing a memory management unit within said data processing system, said memory management unit having a translation buffer and a translation algorithm for translating every effective address within said data processing system into a real address within said memory;

establishing a translation array within said fetcher unit;

storing within said translation array a small number of translation objects to be utilized for translating selected effective addresses among said plurality of effective addresses into real addresses; and periodically varying said small number of translation objects stored within said translation array utilizing said memory management unit wherein effective addresses may be efficiently translated utilizing said translation assay into real addresses without continual access to said memory management unit.

2. The method according to claim 1, wherein said step of periodically varying said small number of translation objects stored within said translation array utilizing said memory management unit comprises the step of periodically altering said small number of translation objects within said translation array utilizing said memory management unit in response to a failure to translate a particular effective address into a real address within said fetcher unit.

3. The method according to claim 1, further including the step of temporarily storing utilization data for said small number of translation objects stored within said translation array in response to a dispatching of a conditional branch instruction to said plurality of processor units and a prediction of an outcome for said conditional branch instruction.

4. The method according to claim 3, further including the step of recovering said temporarily stored utilization data for said small number of translation objects following a refutation of said prediction of said outcome for said conditional branch instruction.

5. The method according to claim 1, wherein said step of establishing a memory management unit within said data processing system, having a translation buffer and a translation algorithm for translating every effective address within said data processing system into a real address within said memory comprises the step of establishing a memory management unit having a translation buffer and multiple translation algorithms for implementing multiple translation techniques for translating every effective address within said data processing system into a real address within said memory.

6. A multiscalar data processing system having a plurality of processor units for executing multiple tasks, memory for storing a plurality of instructions and data at multiple real addresses therein and a fetcher unit for fetching and dispatching instructions to said plurality of processor units, for efficiently translating a plurality of effective instruction addresses utilized within said multiple tasks into real addresses within said memory, said multiscalar data processing system comprising;

a memory management unit within said data processing system, said memory management unit including a translation buffer and translation algorithm for translating every effective address within said data processing system into a real address within said memory;

a translation array within said fetcher unit;

a small number of translation objects stored within said translation array for translating selected effective addresses among said plurality of effective addresses into real addresses; and means for periodically varying said small number of translation objects stored within said translation array utilizing said memory management unit wherein effective addresses may be efficiently translated utilizing said translations array into real addresses without continual access to said memory management unit.

7. The multiscalar data processing system according to claim 6, wherein said means for periodically varying said small number of translation objects stored within said translation array utilizing said memory management unit comprises means for periodically varying said small number of translation objects stored within said translation array utilizing said memory management unit in response to a failure to translate a particular effective address into a real address within said fetcher unit.

8. The multiscalar data processing system according to claim 6, wherein said small number of translation objects comprises four translation objects.

9. The multiscalar data processing system according to claim 6, further including means for temporarily storing utilization data for said small number of translation objects stored within said translation array in response to a dispatching of a conditional branch instruction to said plurality of processor units and a prediction of an outcome for such conditional branch instruction.

10. The method according to claim 9, further including means for recovering said temporarily stored utilization data for said small number of translation objects into said translation array following a refutation of said prediction of said outcome for said conditional branch instruction.

* * * * *